US009374185B2

(12) United States Patent
Rasras

(10) Patent No.: US 9,374,185 B2
(45) Date of Patent: Jun. 21, 2016

(54) DUAL-POLARIZATION MULTI-WAVELENGTH COHERENT RECEIVER FRONTEND

(75) Inventor: Mahmoud Rasras, Berkeley Heights, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 182 days.

(21) Appl. No.: 13/346,337

(22) Filed: Jan. 9, 2012

(65) Prior Publication Data

US 2013/0177027 A1 Jul. 11, 2013

(51) Int. Cl.
| H04J 14/00 | (2006.01) |
| H04J 14/06 | (2006.01) |
| H04B 10/61 | (2013.01) |
| G02B 6/27 | (2006.01) |

(52) U.S. Cl.
CPC ............ *H04J 14/002* (2013.01); *H04B 10/615* (2013.01); *H04J 14/06* (2013.01); *G02B 6/272* (2013.01)

(58) Field of Classification Search
CPC ......... H04J 14/022; H04J 14/02; H04J 14/06; H04J 14/0208; G02B 6/12019; G02B 6/272
USPC .................... 370/464; 398/65–85; 385/24–27
See application file for complete search history.

(56) References Cited

U.S. PATENT DOCUMENTS

| 7,724,991 | B1 * | 5/2010 | Doerr .............................. 385/14 |
| 2005/0111789 | A1 * | 5/2005 | Hayes ............................. 385/27 |
| 2009/0220234 | A1 * | 9/2009 | Sato et al. ....................... 398/79 |
| 2009/0226173 | A1 * | 9/2009 | Yano et al. ....................... 398/85 |
| 2010/0119230 | A1 * | 5/2010 | Terada ............................. 398/79 |
| 2010/0158521 | A1 * | 6/2010 | Doerr et al. ...................... 398/65 |
| 2010/0322631 | A1 * | 12/2010 | Nagarajan et al. .............. 398/65 |

FOREIGN PATENT DOCUMENTS

| WO | 2009004682 A1 | 1/2009 |
| WO | 2010080721 A1 | 7/2010 |
| WO | 2010/107439 A1 | 9/2010 |
| WO | 2011/019683 A1 | 2/2011 |

OTHER PUBLICATIONS

Takahashi, Hiroshi, et al., Transmission characteristics of Arrayed Waveguide N × N Wavelength Multiplexer, 1995 IEEE, Journal of Lightwave Technology, vol. 13, No. 3, Mar. 1995, pp. 447-455.

(Continued)

*Primary Examiner* — Un C Cho
*Assistant Examiner* — Fangyan Deng
(74) *Attorney, Agent, or Firm* — Parker Justiss, PC

(57) ABSTRACT

An apparatus includes an AWG demultiplexer having first and second adjacent input ports. The first input port is configured to receive a first WDM data-bearing signal, the second input port is configured to receive a first WDM LO signal. The first and second input ports are located such that individual channels of said WDM data-bearing signal route to a first set of output ports, and individual channels of said WDM LO signal route to a second set of output ports interleaved with the first set.

20 Claims, 8 Drawing Sheets

(56) References Cited

OTHER PUBLICATIONS

Adam, Ismahayati, et al., "Design of Arrayed Waveguide Grating (AWG) for DWDM/CWDM Applications Based on BCB Polymer", Faculty of Electrical Engineering Universiti Teknologi Malaysia, vol. 10, No. 2, 2008, pp. 18-21.

"APPS Apollo Application Note on Array Waveguide Grating (AWG) Apollo Photonics", Apollo Photonics, Apollo Inc., Jul. 15, 2003, 24 Pages.

LIDGATE, Simon (Dr), Chapter 2—Arrayed Waveguide Gratings, Application and Design, Advanced Finite Difference—Beam Propagation Method Analysis of Complex Components, University of Nottingham, 2004, pp. 16-32 and Abstract 1 pg.

Doerr, et al., "Monolithic Polarization and Phase Diversity Coherent Receiver in Silicon," J. Lightwave Technol. 28, 520-525 (2010).

Doerr, et al., "Monolithic InP Multiwavelength Coherent Receiver Using a chirped Arrayed Waveguide Grating." Lightwave Technology, Journal of 29.4 (2011): 536-541.

* cited by examiner

DUAL-POLARIZATION MULTI-WAVELENGTH COHERENT RECEIVER FRONTEND

TECHNICAL FIELD

This disclosure is directed, in general, to optical communications systems and methods.

BACKGROUND

This section introduces aspects that may be helpful to facilitating a better understanding of the inventions. Accordingly, the statements of this section are to be read in this light and are not to be understood as admissions about what is in the prior art or what is not in the prior art.

It is expected that future optical networks will employ coherent polarization-multiplex quadrature phase-shift-keying (PM-QPSK) transmission format for efficient use of spectral bandwidth. Such formats will most likely be used in long-haul and ultra-long-haul (LH/ULH) dense wavelength-division multiplexing (DWDM) systems. Furthermore, to overcome the bottleneck in transponder interface rates, next-generation coherent receivers are expected to employ multi-wavelength reception to increase the degree of optical parallelism, hence increasing system capacity. This increased capacity does, however, typically require more complex receiver frontends.

SUMMARY

One aspect provides an apparatus, e.g. an optical receiver. The apparatus includes an arrayed waveguide grating (AWG) demultiplexer having first and second adjacent input ports. The first input port is configured to receive a first WDM data-bearing signal, and the second input port is configured to receive a first WDM LO signal. The first and second input ports are located such that individual channels of the WDM data-bearing signal route to a first set of output ports of the AWG, and individual channels of the WDM LO signal route to a second set of output ports interleaved with the first set.

Another aspect provides a method, e.g. of forming an optical receiver. An AWG demultiplexer is formed having a first input port and an adjacent second input port. The first input port is configured to receive a first WDM data-bearing signal. The second input port is configured to receive a first WDM LO signal. The first and second input ports are located such that individual channels of the WDM data-bearing signal route to a first set of output ports and individual channels of the WDM LO signal route to a second set of output ports interleaved with the first set.

BRIEF DESCRIPTION

Reference is now made to the following descriptions taken in conjunction with the accompanying drawings, in which:

FIG. 1 presents in an illustrative embodiment an optical system, including an optical WDM demultiplexer, configured to demodulate a received polarization-diverse WDM optical signal;

DETAILED DESCRIPTION

Embodiments described herein provide a single device that integrates a demultiplexer (e.g. an AWG), polarization beam splitters (PBS), and 90° hybrid on a single PLC substrate. Various embodiments further provide a demultiplexer (demux) type that receives a multi-wavelength (e.g. wavelength-division multiplexed, or WDM) data-bearing signal comb at a first input port and an LO comb at another input port. At the demux output, each wavelength component of the signal and its corresponding LO are then routed to two separate adjacent waveguides, where the signal and the LO can be further coupled to a 90° hybrid mixer. Some embodiments that implement dual-polarization reception employ the same demux to independently route each polarization component to a different set of 90° hybrid mixers.

Various embodiments described here employ a waveguide material with relatively low refractive index (RI or $n_r$) for optical components and waveguide interconnects to reduce insertion loss and temperature sensitivity of the components and waveguides, thereby significantly improving the coherent receiver responsivity and its temperature stability. Moreover demultiplexing both the signal and LO combs for dual-polarization reception using a single AWG provides a low cost solution suitable for future 400G and LH/ULH networks.

Figure 1:
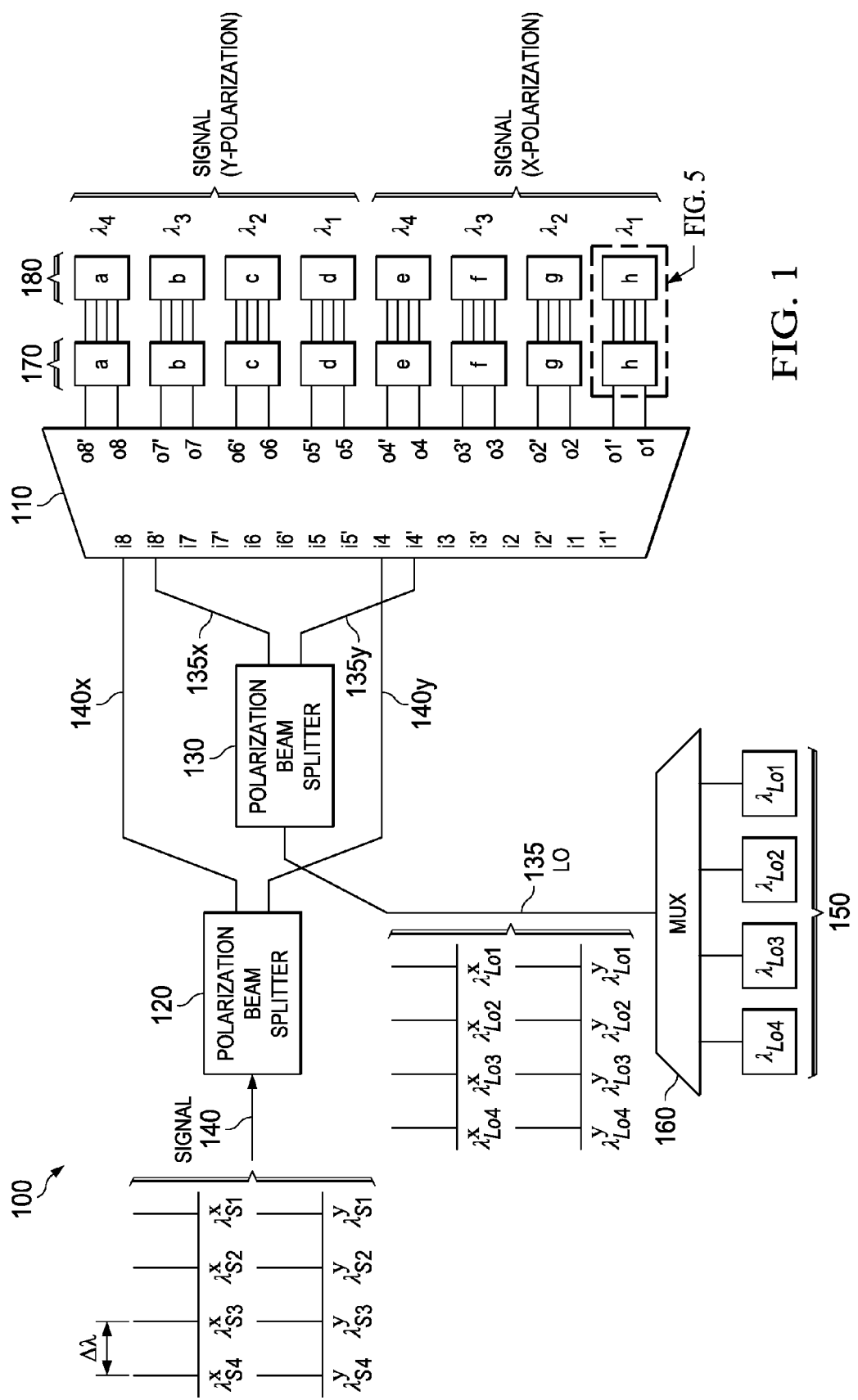

FIG. 1 illustrates an optical system 100 according to one illustrative and nonlimiting embodiment. The system 100 includes a demultiplexer ("demux") 110, a first polarization beam splitter ("PBS") 120 and a second PBS 130. The first PBS 120 receives an optical input signal 140 modulated to carry data, e.g. digital data. The input signal 140 may be polarization diverse, e.g. including light of a first polarization, e.g. transverse electric (TE, or X) and light of a second polarization, e.g. transverse magnetic (TM, or Y). Light of each polarization may also be wavelength division multiplexed to include data in a number of WDM channels. For illustration and without limitation the input signal 140 includes four channels at wavelengths $\lambda_1$, $\lambda_2$, $\lambda_3$ and $\lambda_4$. For clarity of the description the X-polarized channels are denoted $\lambda_{S1}^x$, $\lambda_{S2}^x$, $\lambda_{S3}^x$ and $\lambda_{S4}^x$, and the Y-polarized channels are denoted $\lambda_{S1}^y$, $\lambda_{S2}^y$, $\lambda_{S3}^y$ and $\lambda_{S4}^y$. The channels are separated by a channel spacing $\Delta\lambda$. The input signal 140 may be referred herein and the claims as the input comb 140. Embodiments are not limited to any particular channel spacing. In an illustrative embodiment, $\Delta\lambda \approx 1.6$ μm, or equivalently $\Delta\nu \approx 200$ GHz. Thus the illustrated embodiment includes eight data channels, each of which may be independently modulated. Those skilled in the pertinent art will appreciate that the principles disclosed herein may be extended to more or fewer WDM channels and greater or lesser channel spacing.

The demux 110 has eight signal input ports denoted i1-i8, and eight interleaved LO input ports denoted i1'-i8'. The demux 110 further has eight signal output ports denoted o1-o8, and eight interleaved LO output ports denoted o1'-o8'. Like numbered inputs and outputs may be respectively referred to herein as input pairs and output pairs. Thus, e.g. i8 and i8' are an input pair, and o8 and o8' are an output pair. In various embodiments the demux 110 comprises an AWG configured to operate as an N×N router. Such configuration allows the demux 110 to receive and demultiplex polarization diverse, e.g., dual-polarization, optical signals. As illustrated in FIG. 1 and discussed further below, if X-polarized light is launched into input port i8, then its wavelength comb components are demultiplexed into the lower 4 output ports, e.g. o1-o4. On the other hand, when the Y-polarization components of the input comb 140 are then launched into input port i4, the components are focused on the upper half of the demux 110 outputs, e.g. o5-o8.

The PBS 130 receives a local oscillator (LO) signal 135. The LO 135 may also be polarization diverse, e.g. X and Y polarized. Light of each polarization may include light at a number of wavelengths. In various embodiments each polarization includes unmodulated light at wavelengths corresponding to each wavelength of the WDM channels carried by the input comb 140, e.g. $\lambda_1$, $\lambda_2$, $\lambda_3$ and $\lambda_4$. The X-channels are denoted $\lambda_{Lo1}^x$, $\lambda_{Lo2}^x$, $\lambda_{Lo3}^x$, and $\lambda_{Lo4}^x$, and the Y-channels are denoted $\lambda_{Lo1}^y$, $\lambda_{Lo2}^y$, $\lambda_{Lo3}^y$ and $\lambda_{Lo4}^y$. While it may be preferable that the LO 135 only include light with the WMD channel wavelengths, embodiments are not limited thereto. The LO 135 signal input to the PBS 130 may be referred to herein and in the claims as the LO comb 130.

The PBS 120 separates the first and second polarizations of the input comb 140. A first portion, e.g. the X-polarized portion, is routed to the i8 input of the demux 110. A second portion, e.g. the Y portion, is routed to the i4 input of the demux 110. The PBS 130 similarly separates X and Y polarization components of the LO comb. The X-polarization portion is routed to the i8' input of the demux 110. The Y-polarized portion is routed to the i4' input of the demux 110.

The ports in each port pair are adjacent ports. Ports are considered to exist whether or not that port is connected to an input or an output waveguide. Those skilled in the art will appreciate that an AWG design provides specific locations of an input face that act to focus received light at an output port location. Thus, the port i4 is considered to be nonadjacent to the input port i8' even if no connections are made to the ports i4-i7 and i4'-i7'. More generally, any ports are considered herein to be nonadjacent when at least one intervening port location, as determined by the AWG design, is unused.

The LO comb 135 may be generated in various embodiments by LO sources 150, e.g. optical sources, and a multiplexer (mux) 160. Each of the LO sources 150 produces light, e.g. unmodulated laser light, at about one of the frequencies of the LO comb, e.g. $\lambda_1$, $\lambda_2$, $\lambda_3$ and $\lambda_4$. Each LO source 150 may produce light of about equal intensity at each of the first and second polarizations, e.g. X and Y. The mux 160 combines the outputs of the LO sources 150 into the LO comb 135. In some alternative embodiments the LO comb, or individual wavelengths of the comb, may be generated external to the substrate upon which the demux 110 is formed and coupled thereto by any suitable coupling device.

The system 100 also includes optical mixers 170a-h, e.g. 90° hybrids, and corresponding balanced detectors 180a-h. Each output pair of the demux 110 is coupled to a corresponding optical mixer 170. The outputs of each hybrid mixer 170 are coupled to a corresponding balanced detector 180. Aspects of the connections between the demux 110 and the mixers 170, and between the mixers 170 and the balanced detectors 180 are discussed further below.

Optical signals are conveyed via unreferenced waveguides between the mux 160 and the PBS 130, between the PBSs 120, 130 and the demux 110, between the demux 110 and the mixers 170, and between the mixers 170 and the balanced detectors 180. The waveguides may be planar waveguides formed over a planar optical substrate, and may optionally be formed from silica, as discussed further below. The PBSs 120, 130, the mux 160 and the demux 110 may be formed from the same optical medium layer used to form of the waveguides.

In some embodiments the mixers 170 are independently optimized for each wavelength received by that mixer 170. For example, the mixer 170a may be optimized for $\lambda_4$, and the mixer 170b may be optimized for $\lambda_3$. Such optimization is expected to reduce mixer filter insertion loss and produce more accurate optical power splitting at its output, potentially resulting in higher received output power at the inputs of the balanced detectors 180.

Figure 6:
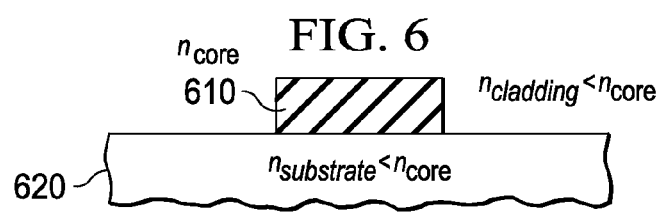
FIG. 6 illustrates aspects of a waveguide structure employed to interconnect various optical components of FIG. 1.

FIG. 6 illustrates a sectional view of a waveguide core 610 over a planar substrate 620. An unreferenced cladding may optionally be air or a dielectric material. The waveguide core 610 is representative of various optical components of the system 100 that may be formed from a planar optical core layer. Such components include, e.g. the demux 110, the PBSs 120, 130, the mux 160, the mixers 170 and waveguides used to interconnect the optical components. The waveguide core has a refractive index (RI) $n_{core}$, while the substrate has an RI $n_{substrate} < n_{core}$, and a cladding has an RI $n_{cladding} < n_{core}$.

Without limitation the optical core layer, and thus the waveguide core 610, may comprise, e.g. silica ($n_f \approx 1.5$), benzocyclobutene (BCB) ($n_f \approx 4.55$), silicon nitride ($n_f \approx 1.8$), InP ($n_f \approx 3.1$), or silicon ($n_f \approx 3.34$). In one nonlimiting embodiment the waveguide core 610 is formed using a 2% index-contrast planar lightwave circuit (PLC) waveguide process. Those skilled in the pertinent art are familiar with various material options and steps necessary to process the various materials.

Advantageously, the use of a low index contrast optical material such as silica or BCB for the core layer may increase fabrication tolerances of the system 100 filter. In this regard the benefit is expected to be positively correlated with lower RI. Thus, in some embodiments an RI of about 3.1 or less is preferred, an RI of about 1.8 or less is more preferred, and an RI of about 1.5 or less is most preferred. The use of an optical material with relatively low loss is expected to result in high responsivity that is further expected to enable better system noise figure than higher-loss alternatives. Without limitation, silica, with a loss figure of merit of 0.03 dB/cm, is expected to be a suitable material choice in this regard. Furthermore, some optical materials, such as silica, have a greater temperature stability (e.g. lower $\partial n/\partial T$) than other optical materials, such as InP. Use of the more temperature-stable optical materials is therefore expected to result in greater temperature stability of the system 100 than for alternatives such as InP.

The substrate 620 may be any material and form compatible with optical processes and devices. In some preferred embodiments the substrate is suitable for processing using automated semiconductor fabrication tools. Some non-optical or opto-electric components, such as the LO sources 150 and the balanced detectors 180 may be hybrid devices integrated with the system 100 using well-known techniques.

Figure 2:
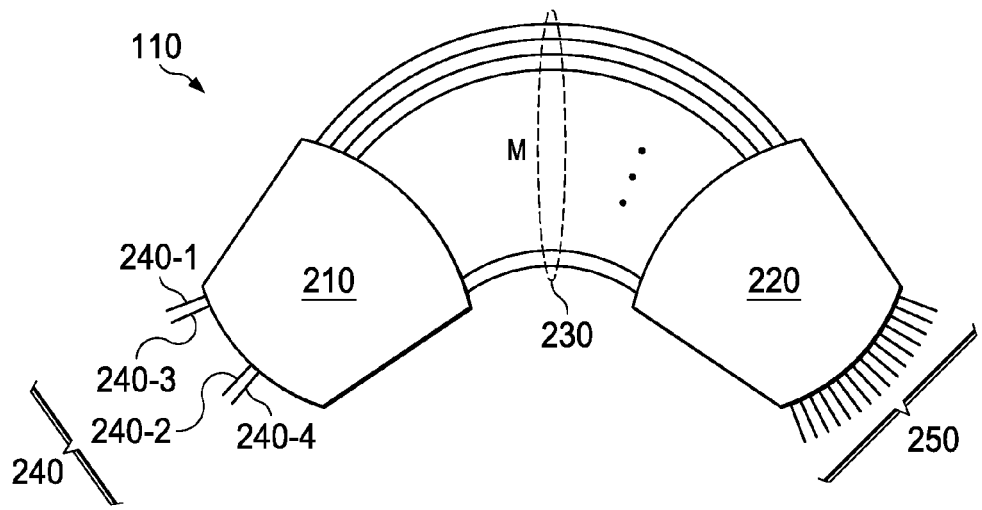
FIG. 2 illustrates aspects of an N×N arrayed waveguide grating (AWG) (N=8) applicable to the multiplexer of FIG. 1.

FIG. 2 illustrates an AWG 200 that may be used as the demux 110 in an illustrative and nonlimiting embodiment. The AWG includes first and second slabs 210 and 220. The slabs 210 and 220 are connected by array waveguides 230. In the illustrated embodiment the AWG 200 is an 8×8 AWG. As such it is designed to have a combination of channel spacing and free spectral range appropriate to focus light input at one of eight locations, e.g. input ports, on the input face of the slab 210, and focus the light on one of eight locations, e.g. output ports on the output face of the slab 220. The spacing between the input ports is determined by the channel wavelength spacing and the focal length of the free-propagation regions of the slabs 210 and 220. Input port and output port locations are determined by physical parameters of the slabs 210 and 220, as described below. The absence of an input or output waveguide does not affect the existence of a port as determined by the physical parameters.

As is appreciated by those skilled in the optical arts, an AWG may be designed for a particular channel spacing. For example, without limitation by theory Eq. 1 relates a channel spacing Δf to various physical aspects of an AWG, $$\Delta f = \frac{\Delta x}{L_f}\left(\frac{d\theta}{df}\right)^{-1} = \frac{\Delta x}{L_f}\left(\frac{m\lambda^2 n_g}{n_s d c n_c}\right)^{-1}, \quad (1)$$

where Δx is the spacing of the input or output ports;
$L_f$ is the focal length of the slab;
dθ/df is angular dispersion;
m is the diffraction order;
λ is the light wavelength;
$n_g$ is the group refractive index;
$n_c$ is the array waveguide refractive index;
$n_s$ is the effective refractive index of the slabs;
d is the pitch length; and
c is the speed of light in the waveguide/slab medium.

As indicated by Eq. 1, the channel spacing Δf is determined in part by the spacing Δx between the input and output ports. Conversely, the port spacing Δx may be determined from Δf given the relationship of Eq. 1 by appropriate manipulation. Conventionally the input ports and output ports of the AWG 200, and any input and output waveguides, are located at integer increments of Δx.

The AWG 200 is illustrated having four input waveguides 240 and 16 output waveguides 250. The input waveguides 240 and output waveguides 250 may respectively be, e.g. portions of waveguides used to convey signals to the input ports and from the output ports. The unconnected input ports retain their identity even when unconnected to an input waveguide. Two input waveguides 240-1 and 240-2 are connected to the slab 210 at locations corresponding to input ports as determined by the channel spacing, e.g. at integer increments of Δx. These ports correspond to, e.g. the input ports i4 and i8 of the demux 110. Two additional input waveguides 240-3 and 240-4 connect to the slab 210 at locations offset from the input waveguides 240-1 and 240-2, and therefore offset from the port locations as determined by physical parameters corresponding to, e.g. the input ports i4' and i8'. The offset distance may be about one half the spacing between the input ports as determined by the channel spacing, e.g. ~Δx/2. Eight of the output waveguides 250 are located at locations corresponding to output ports as determined by the channel spacing, e.g. at integer increments of Δx. These outputs correspond to, e.g. the output ports o1-o8 of the demux 110. Eight additional output waveguides 250 are each offset from the first eight outputs by a distance that again may be about one half the distance between the output ports as determined by channel spacing considerations, e.g. ~Δx/2. These outputs correspond to, e.g. the output ports o1'-o8' of the demux 110.

Thus, some embodiments provide a novel configuration of the AWG 200 in which some of the input waveguides and the output waveguides are located at positions about half way between conventional input and output waveguide locations as determined by, e.g. Eq. 1. In other words, for example if i4 is located at a position $x_4$ at the input slab 210, then i4' is located at $x_4+\Delta x/2$. Similarly, if i8 is located at $x_8$, i8' is located at $x_8+\Delta x/2$. The offset input and output waveguide locations are referred to herein as half-channel locations. In various embodiments Δx/2 may be a positive or a negative offset from the nominal channel input position. The locations of the channel inputs i1 . . . i8 may be determined from the physical characteristics of the AWG 200. Thus, by inspection of the AWG it may be determined that the half-channel inputs i1'-i8' are located at half-channel positions, e.g. offset by about Δx/2 from the standard channel input locations.

In some cases, without some accommodation by the AWG 200 the signals input to the ports i4' and i8' may not be resolvable at the ports o1'-o8'. This issue may be addressed by including a greater number of array waveguide 230 than would typically be used for an 8×8 AWG. Typically, an N×N AWG includes about 3N channel waveguides. For example, an 8×8 AWG would typically have 24 array waveguides. In contrast with such conventional design practice, the AWG 200 may be configured to have a narrower channel response than is typical to resolve the half-channel signals. Thus, in various embodiments the number of array waveguides 230 is greater than 3N. In some embodiments the number of array waveguides 230 is at least about 3.5N and preferably at least about 4N. Thus the AWG 200 in some embodiments may have about 32 array waveguides 230. Thus, when the WDM channel spacing (Δλ) is about 1.6 μm, the AWG 200 may resolve the LO frequency components when the ports i4', i8' and o1'-o8' are offset by a spacing equivalent to about 800 nm of wavelength.

In an alternate embodiment, instead of the 8×8 AWG with 200 GHz spacing and input/output waveguides located at half-channel positions, a 16×16 AWG may be used with one-half the channel spacing of the input signal 140, e.g. 100 GHz spacing. In such embodiments, an AWG configured within the scope of the disclosure may be determined from the channel spacing of the AWG, determined from physical characteristics, and the channel spacing of a received optical WDN signal. In such embodiments, the input signals 140x and 140y may be input to, e.g. even numbered channel inputs of the AWG, and the LO signals 135x and 135y may be input to odd number channels adjacent the respective input signals. In this configuration each output signal and its corresponding output LO will be located at adjacent outputs of the AWG as previously described.

Those skilled in the pertinent art are capable of extending the principles discussed above to systems having, e.g. different channel spacing, and a different number of AWG channels. Such alternate embodiments are contemplated by and within the scope of the disclosure.

Figure 3:
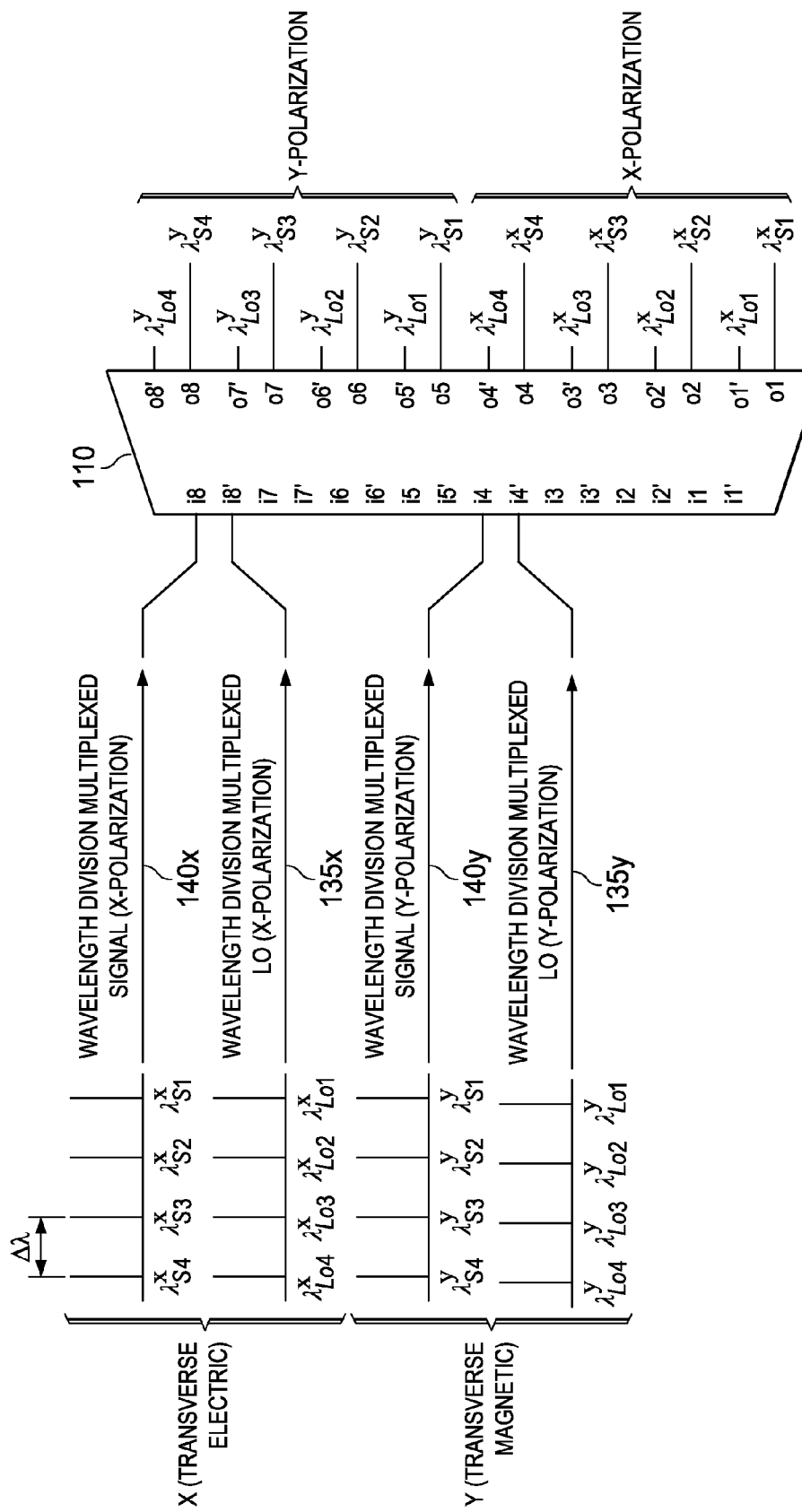
FIG. 3 illustrates the WDM demultiplexer of FIG. 1 in isolation to show various relationships between input signals and output signals.

FIG. 3 illustrates the demux 110 in separate detail to illustrate various aspects more clearly. In this figure the input signal channel components are each schematically illustrated with a line that is twice as long as the lines illustrating the LO channel components. This illustration convention is used herein to aid tracking the signal propagation through the demux 110, and does not denote any difference in signal component intensity.

FIG. 3 is described without limitation for embodiments in which the demux 110 is an AWG demux configured with half-channel ports. The inputs i1-i8 are located at the physical locations of the AWG 200 that correspond to the nominal channel inputs for the AWG 200 configured for the channel spacing of the input signal 140. The inputs i1'-i8' are physically offset from the signal inputs i1-i8 such that the LO inputs i1'-i7' are interleaved with the signal inputs i1-i8. In various embodiments the LO inputs i1'-i7' are located about half way between the signal inputs i1-i8. Thus the LO inputs may be offset by a half channel as previously described. For example, the WMD channel spacing Δν may be ~200 GHz, with the signal inputs i1-i8 located at the 200 GHz input port locations and the LO inputs i1'-i7' offset by about 100 GHz from the signal inputs.

The output ports o1-o8 output frequency components of the input comb 140, and may therefore be referred to as signal output ports. The output ports o1'-o8' output frequency components of the LO comb 135, and may therefore be referred to as LO output ports. The LO output ports o1'-o8' are physically offset from the signal output ports o1-o8 such that the LO output ports i1'-i7' are interleaved with the signal output ports o1-o8. In various embodiments the LO output ports o1'-o7' are located about half way between the signal output ports o1-o8. The output ports o1-o8 and o1'-o8' are each associated with an output waveguide (not shown) physically located at the output face of the demux 110 to receive the intended signal channel.

In some embodiments the input and output waveguides of the AWG 200 may be selected such that the outermost waveguides are unused. A typical N×N may have a 3 dB excess loss at the outermost AWG inputs. Thus, in some embodiments, an interior subset of the N channels may be used to avoid insertion loss that would result if the outermost waveguides were used. In a more specific example in which N=16, input waveguides at locations i12, i12' (following the naming convention exemplified by FIG. 3) can be used as the inputs for the x-polarization and input waveguides i8, i8' can be used for the Y-polarization. Alternatively, input waveguides i8, i8' and i4, i4' could be used. Thus, those skilled in the optical arts will recognize the embodiment of FIG. 1 is but one example of various AWG configurations that result in mapping of AWG inputs to outputs that results in the described operation of the system 100.

Figure 4A:
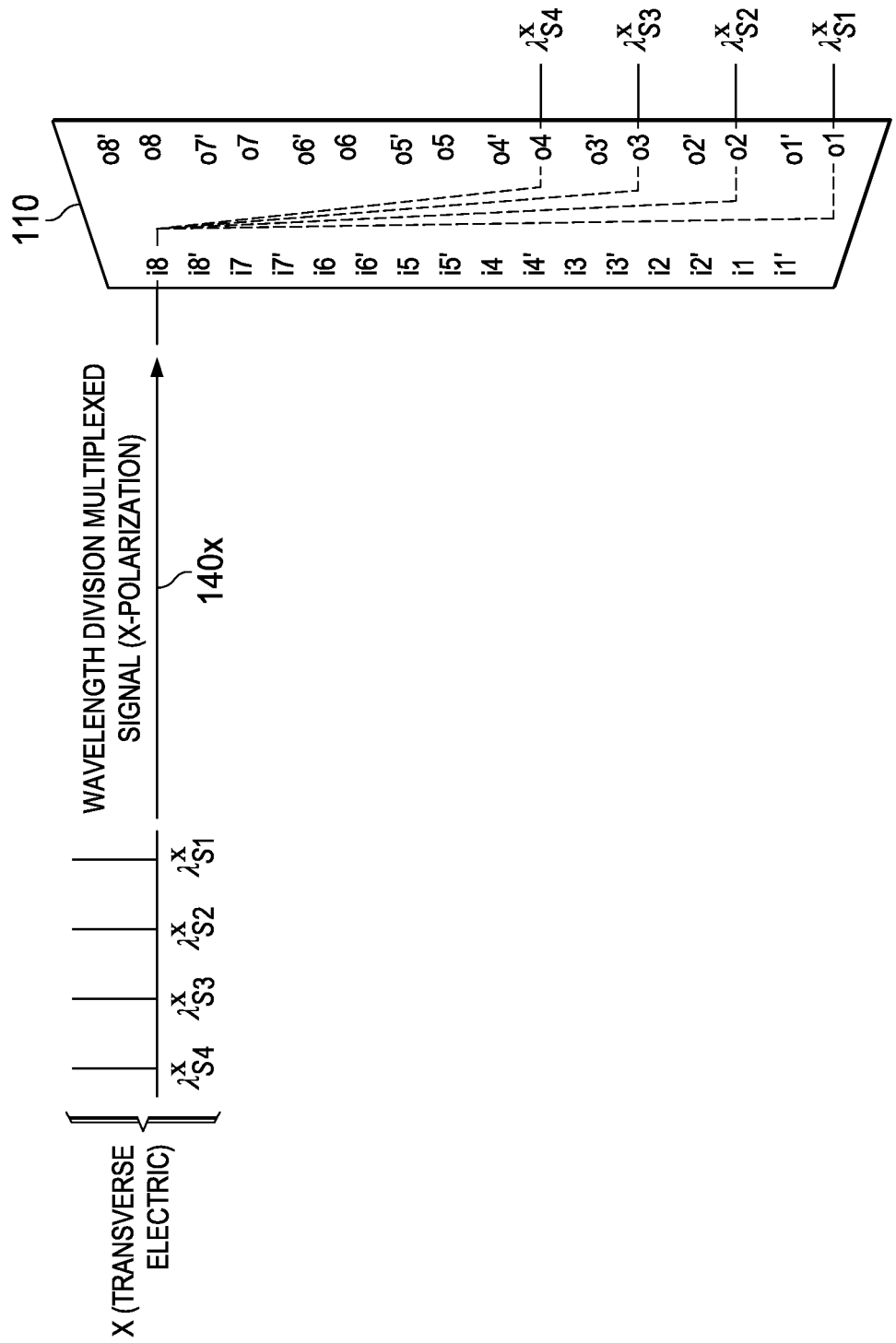
FIGS. 4A-4D illustrate the routing between inputs and outputs of signals within the WDM demultiplexer of FIG. 1.
Figure 4B:
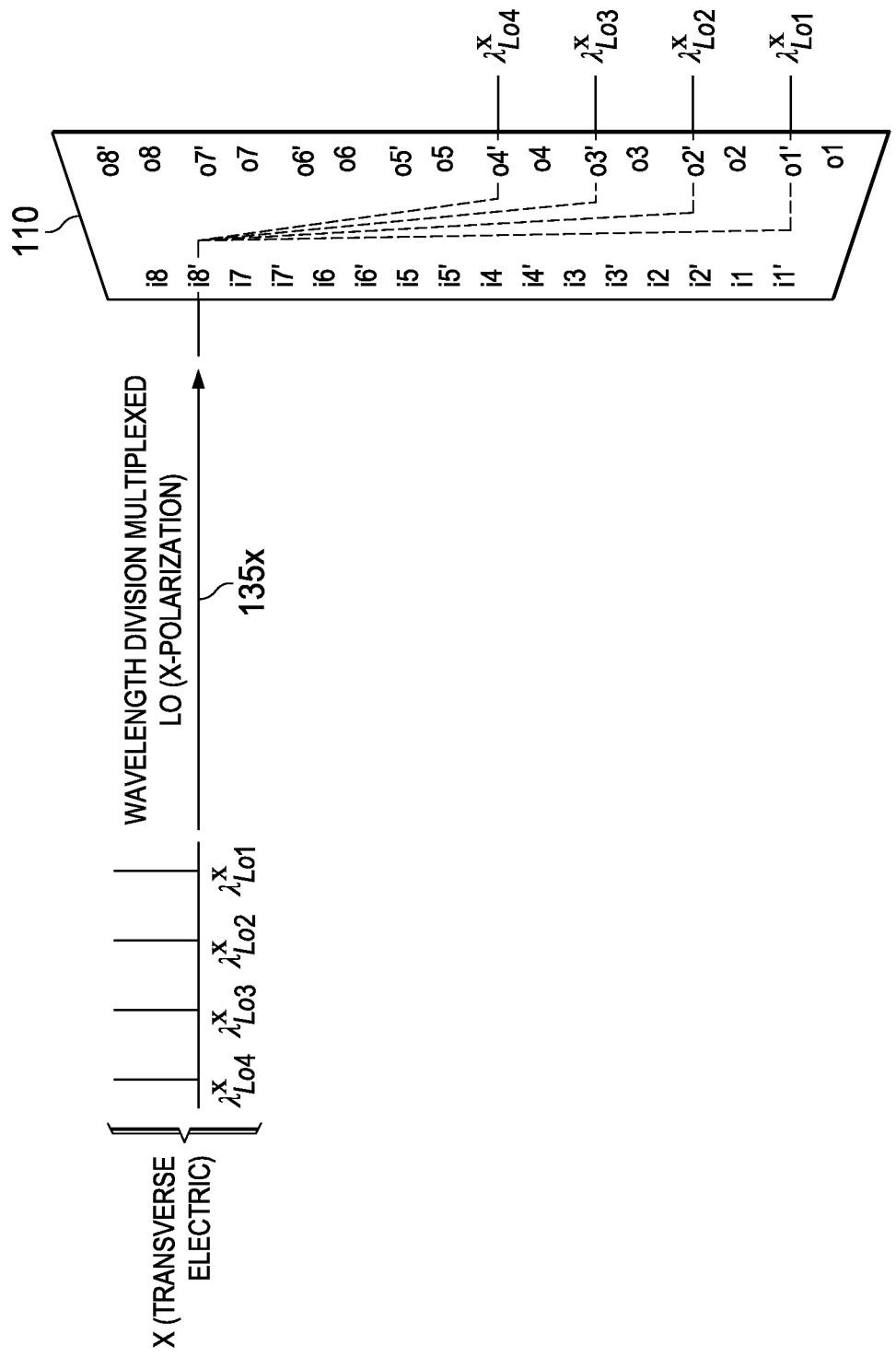

FIG. 4A-4D illustrate the routing of light of the input comb 140 and the LO comb 135 within the demux 110. FIG. 4A illustrates the case of the X (e.g. TE) polarization component 140x received by the input i8. Different wavelengths of the input comb focus to different outputs, with the longer wavelengths being focused onto lower ports. Thus the $\lambda_{S1}^x$ channel is routed to the of output, the $\lambda_{S2}^x$ channel is routed to the o2 output, the $\lambda_{S3}^x$ channel is routed to the o3 output, and the $\lambda_{S4}^x$ channel is routed to the o4 output. FIG. 4B illustrates the case of the X polarization LO component 135x received by the input i8'. The different wavelengths of the LO comb focus to different LO output ports that are adjacent and at the upper side of the corresponding signal output ports. Thus the $\lambda_{Lo1}^x$ channel is routed to the o1' output, the $\lambda_{Lo2}^x$ channel is routed to the o2' output, the $\lambda_{Lo3}^x$ channel is routed to the o3' output, and the $\lambda_{Lo4}^x$ channel is routed to the o4' output.

Figure 4C:
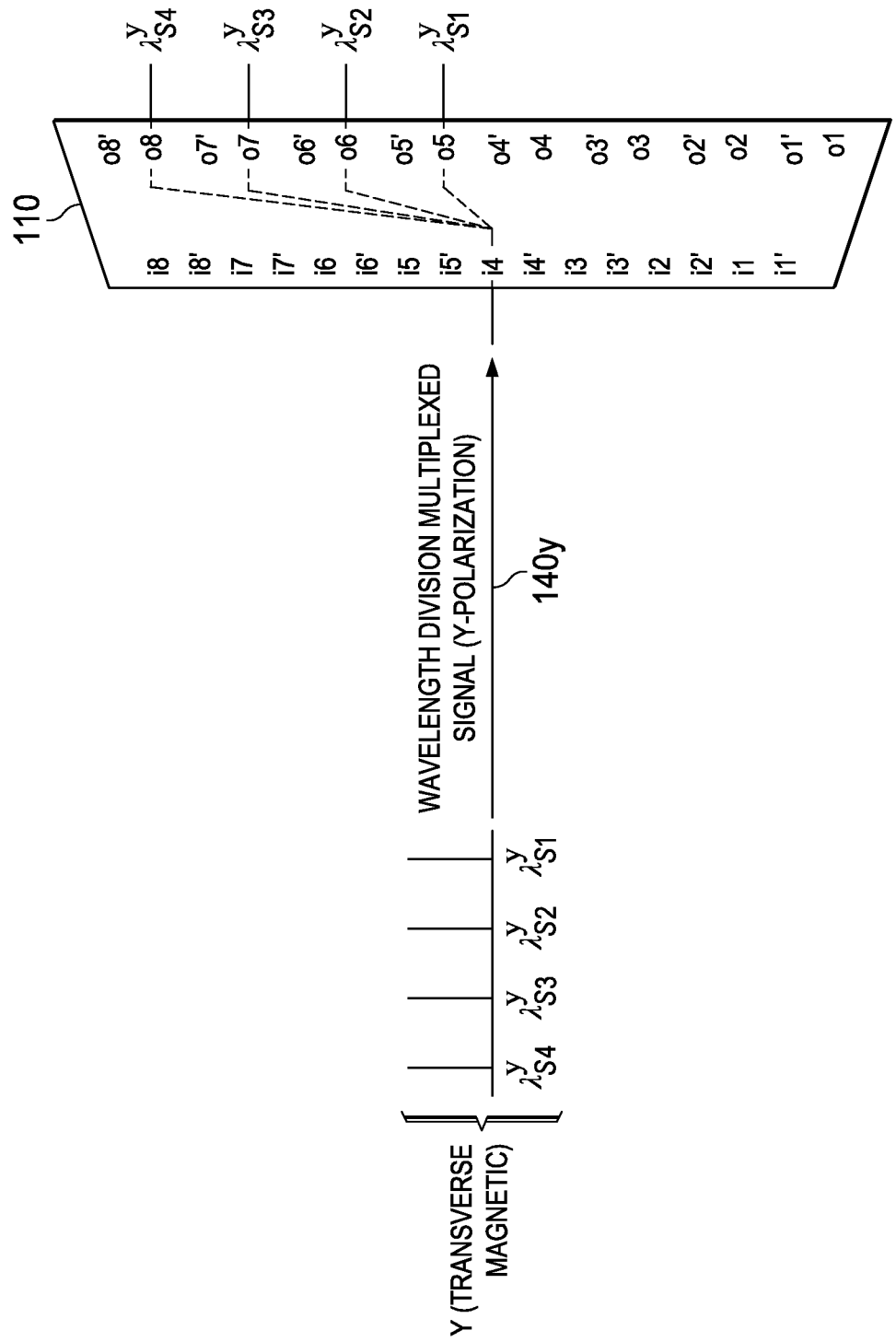
Figure 4D:
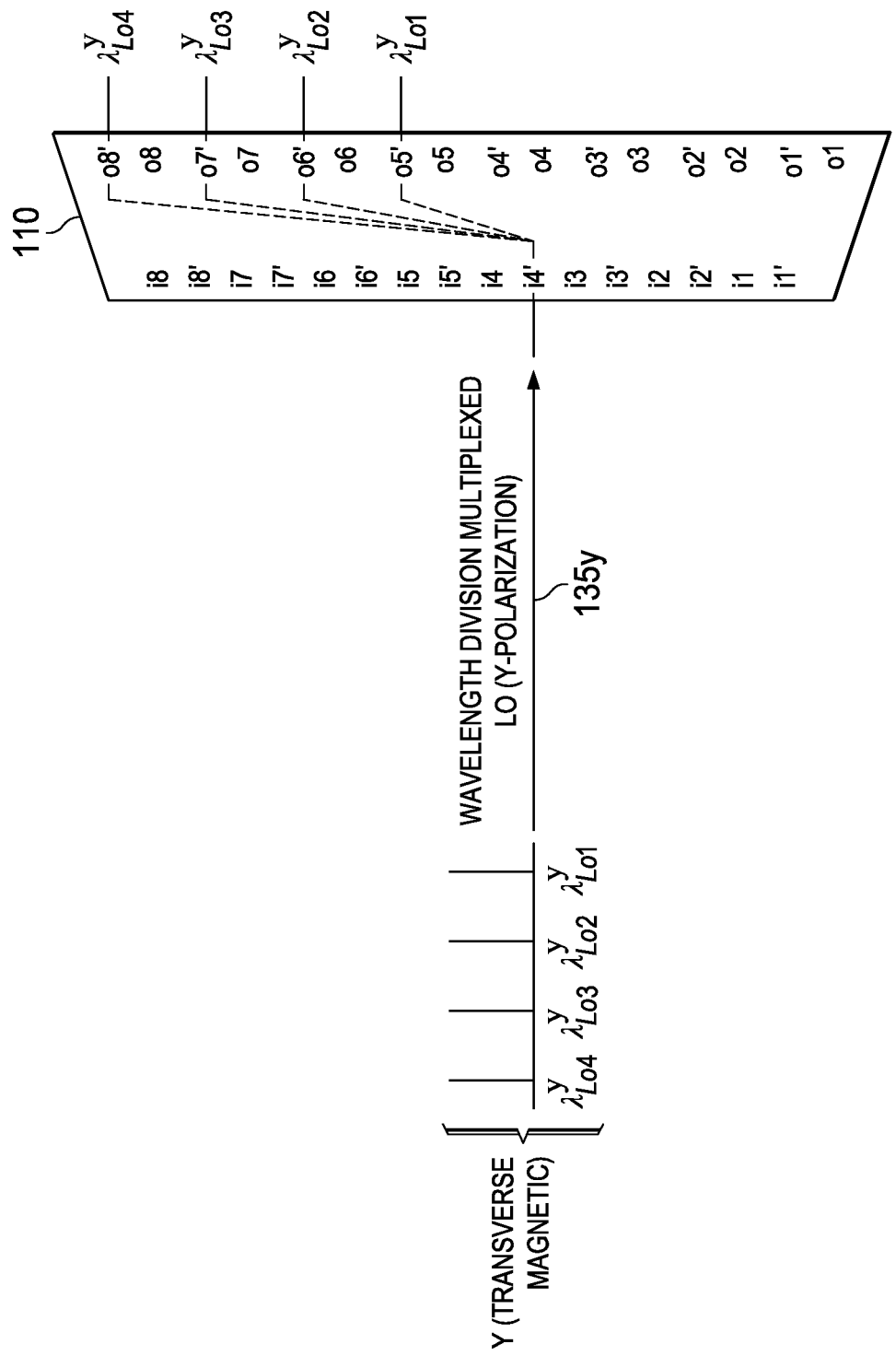

FIG. 4C illustrates the case of the TM or Y polarization signal component 140y received by the input i4. The $\lambda_{S1}^y$ channel is routed to the o5 output, the $\lambda_{S2}^y$ channel is routed to the o6 output, the $\lambda_{S3}^y$ channel is routed to the o7 output, and the $\lambda_{S4}^y$ channel is routed to the o8 output. FIG. 4D illustrates the case of the TM or Y polarization LO component 135y received by the input i4'. The $\lambda_{Lo1}^y$ channel is routed to the o5' output, the $\lambda_{Lo2}^y$ channel is routed to the o6' output, the $\lambda_{Lo3}^y$ channel is routed to the o7' output, and the $\lambda_{Lo4}^y$ channel is routed to the o8' output.

Again considering FIG. 3, several aspects are noted. First, the signals corresponding to the X-polarization component are grouped together and the signals corresponding to the Y-polarization component are grouped together. Second, the groups corresponding to the two polarization components are disjoint. Herein disjoint means the set of output ports corresponding to the X polarization and the set of output ports corresponding to the Y polarization do not overlap. In other words, none of the outputs bearing signal or LO components of the X polarization are located between outputs bearing signal components of the Y polarization, and vice-versa, e.g. the X polarization outputs and the Y polarization outputs are not interleaved. Third, each signal component is routed to an output that is adjacent to a corresponding LO component. Thus, for example, $\lambda_{S1}^x$ is located adjacent $\lambda_{Lo1}^x$, $\lambda_{S2}^x$ is located adjacent $\lambda_{Lo2}^x$, and so on. The outputs thus form eight output pairs, each pair consisting of a signal component output and its corresponding LO component output. Finally, while FIGS. 1 and 3 shows both X and Y polarizations present, embodiments are not so limited. In other words, the input comb 140 may include only the X polarization component, only the Y polarization component, or may include both the X and Y polarization components. Similarly the LO comb may include one or both of the X and Y polarization components.

Figure 5:
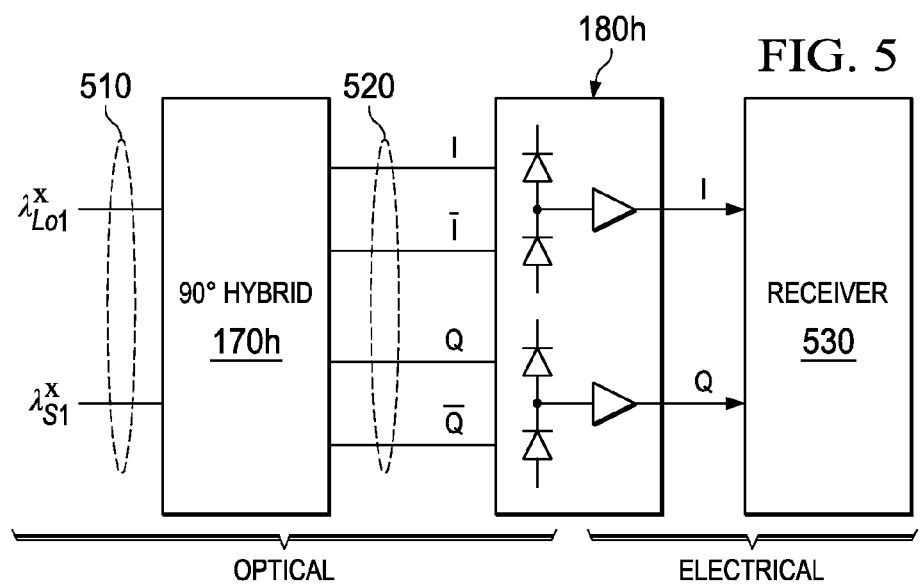
FIG. 5 illustrates aspects of connectivity between the WDM demultiplexer of FIG. 1 and an optical hybrid, and between the hybrid and a balanced detector.

FIG. 5 presents the mixer 170h and the balanced detector 180h in a detail view to highlight various aspects of the connections therebetween. The mixer 170h receives the $\lambda_{S1}^x$ and $\lambda_{Lo1}^x$ signals via waveguides 510. The mixer 170h produces complementary I and $\bar{I}$ optical signals and complementary Q and $\bar{Q}$ optical signals. Waveguides 520 convey the I, $\bar{I}$, Q and $\bar{Q}$ signals to the balanced detector 180h. The balanced detector 180h outputs electrical I and Q signals to a receiver 530 for further processing in the electrical domain.

Notably, in contrast to typical conventional implementations of optical receiver systems, the waveguides 510 do not cross each other, and the waveguides 520 do not cross each other. For example, a conventional coherent receiver typically would be designed with one AWG each for the in-phase and quadrature channels. If these channels are polarization-diverse the conventional receiver would typically use four AWGs, including one for each polarization channel in each of the in-phase and quadrature channels. When the outputs of the AWGs are coupled by planar waveguides to hybrid mixers, the waveguides typically cross, resulting in, e.g. crosstalk between the optical signals conveyed by the waveguides.

In contrast with such conventional design practice, by virtue of the ordering of the signal and LO components at the output of the demux 110, no waveguide crossings are necessary between the demux 110 and the mixer 170h, or between the mixer 170h and the balanced detector 180h. The lack of crossings is expected to result in improved performance relative to systems that include waveguide crossings by, e.g. the reduction or elimination of crosstalk between the signal components.

Figure 7:
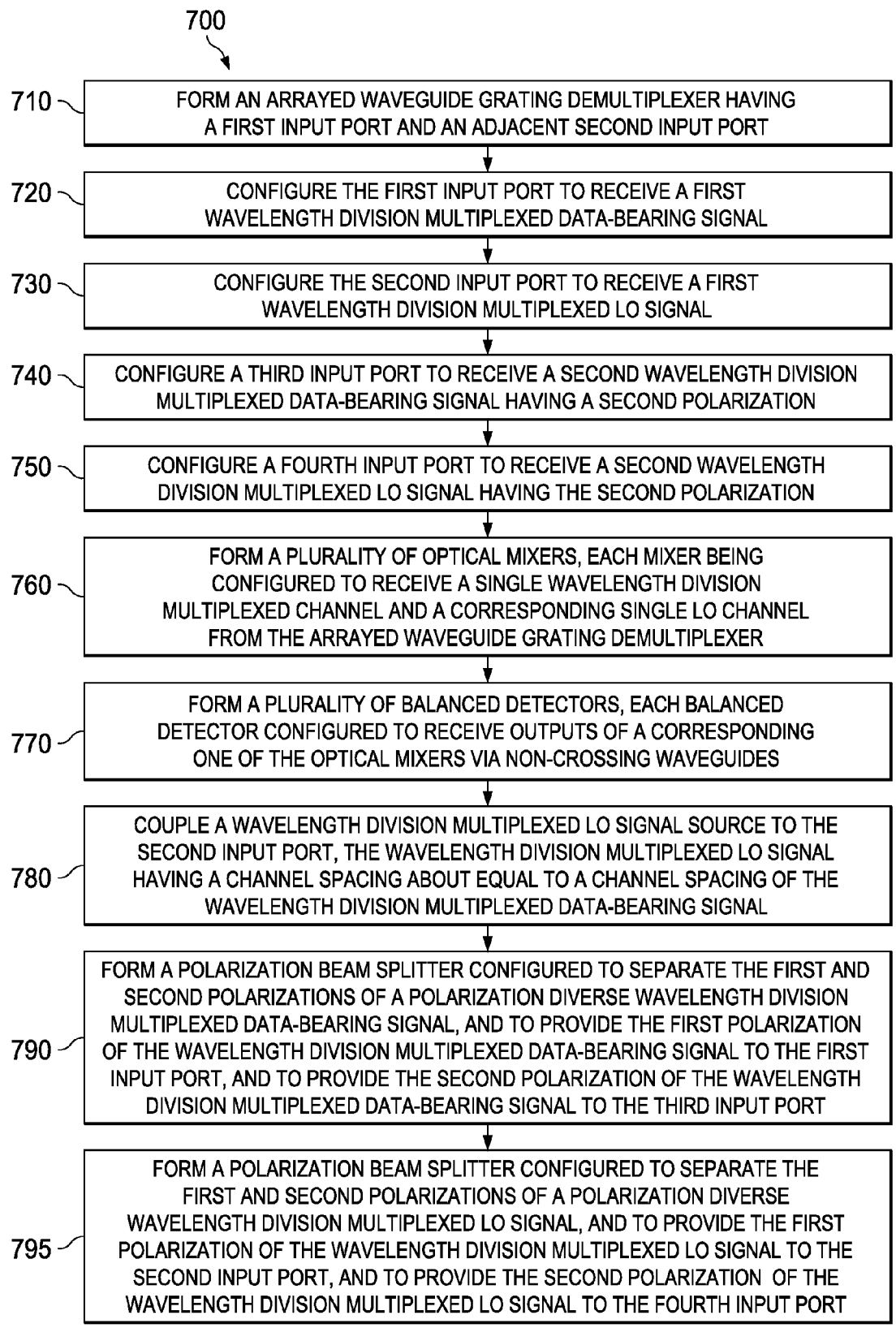
FIG. 7 presents a method, e.g. for forming an optical system, e.g. the system of FIG. 1.

Turning to FIG. 7, a method 700, e.g. for forming an optical device is presented. The steps of the method 700 are described without limitation by reference to elements previously described herein, e.g. in FIGS. 1-6. The steps of the method 700 may be performed in another order than the illustrated order, and in some embodiments may be omitted altogether.

In a step 710 an AWG demultiplexer, e.g. the demux 110, is formed having a first input port and an adjacent second input port, e.g. the ports i8 and i8'. In a step 720 the first input port is configured to receive a first WDM data-bearing signal, e.g. the signal 140x. In a step 730 the second input port is configured to receive a first WDM LO signal, e.g. the signal 135x. The first and second input ports are located such that individual channels of the WDM data-bearing signal route to a first set of output ports, e.g. the ports o5-o8, and individual channels of the WDM LO signal route to a second set of output ports, e.g. o5'-o8', wherein the first and second sets are interleaved.

In the above-described embodiment, the first WDM data-bearing signal and the first WDM LO signal may have a first polarization. In such cases the forming may include forming a third input port and an adjacent fourth input port of the AWG demultiplexer, e.g. the ports i4 and i4'. In such embodiments the method may further include a step 740 in which the third input port is configured to receive a second WDM data-bearing signal having a second polarization. In a step 750 the fourth input port may be configured to receive a second WDM LO signal having the second polarization. The third and fourth input ports may be located such that individual channels of the second WDM data-bearing signal route to a third set of output ports and individual channels of the second WDM LO signal route to a fourth set of output ports, wherein the third and fourth sets are interleaved.

In any of the above-described embodiments the method may include a step 760 in which a plurality of optical mixers are formed, e.g. the mixers 170. Each mixer may be configured to receive a single WDM channel and a corresponding single LO channel from the AWG demultiplexer. In such embodiments the method may further include a step 770, in which a plurality of balanced detectors are formed, e.g. the detectors 180. Each balanced detector may be configured to receive outputs of a corresponding one of the optical mixers via non-crossing waveguides.

In any of the above-described embodiments, the method 700 may include a step 780 in which a WDM LO signal source, e.g. the source 150, is coupled to the second input port. The WDM LO signal may have a channel spacing about equal to a channel spacing of the WDM data-bearing signal.

In some of the above-described embodiments the method 700 may include a step 790 in which a polarization beam splitter is formed, e.g. the PBS 120. The beam splitter may be configured to separate the first and second polarizations of a polarization diverse WDM data-bearing signal, and to provide the first WDM data-bearing signal to the first input port, and to provide the second WDM data-bearing signal to the third input port.

In some of the above-described embodiments the method 700 includes a step 795 in which a polarization beam splitter is formed, e.g. the PBS 130. The beam splitter may be configured to separate the first and second polarization components of a polarization diverse WDM LO signal, and to provide the first polarization component to the second input port, and to provide the second polarization component to the fourth input port.

In any of the above-described embodiments the AWG demultiplexer may be configured to have a channel spacing that is about one half a channel spacing of the data signal comb. In any of the above-described embodiments the AWG demultiplexer, and input and output waveguides connected to the AWG demultiplexer may be formed from a planar silica layer. In some of the above-described embodiments the first and second input ports may be adjacent ports, the third and fourth input ports may be adjacent ports, and the second and third input ports may be separated by a plurality of unused input ports.

Those skilled in the art to which this disclosure relates will appreciate that other and further additions, deletions, substitutions and modifications may be made to the described embodiments.

What is claimed is:

1. An apparatus, comprising:
   an arrayed waveguide grating (AWG) demultiplexer having an input slab having:
      a first set of input ports each configured to receive individual channels of a first set of wavelength division multiplexing (WDM) data-bearing signals of a first polarization;
      a second set of input ports each configured to receive individual channels of a first set of WDM local oscillator (LO) signals of said first polarization, wherein said first set of input ports and said second set of input ports are adjacent to and interleaved with each other;
      a third set of input ports configured to receive individual channels of a second set of WDM data-bearing signals of a second polarization; and
      a fourth set of input ports configured to receive individual channels of a second set of WDM LO signals of said second polarization, wherein said third set of input ports and said fourth set of input ports are adjacent to and interleaved with each other, and, said first set of input ports and said second set of input ports are disjoint from said third set of input ports and said fourth set of input ports.

2. The apparatus of claim 1, wherein said AWG is configured to route:
   said individual channels of said first set of WDM data-bearing signals of said first polarization to a first set of output ports of an output slab of said AWG;
   said individual channels of said first set of WDM LO signals of said first polarization to a second set of output ports of said output slab, wherein said first set of output ports and said second set of output ports are adjacent to and interleaved with each other;
   said individual channels of said second set of WDM data-bearing signals of said second polarization to a third set of output ports of said output slab; and
   said individual channels of said second set of WDM LO signals of said second polarization to a fourth set of output ports of said output slab, wherein said third set of output ports and said fourth set of output ports are adjacent to and interleaved with each other, and, said first set of output ports and said second set of output ports are disjoint from said third set of output ports and said fourth set of output ports.

3. The apparatus of claim 1, wherein said AWG demultiplexer is configured to have a channel spacing that is about one half a channel spacing of the data signal comb.

4. The apparatus of claim 1, further including a plurality of optical mixers, each mixer being configured: to receive one of said individual channels of said first set of WDM data-bearing signals of said first polarization from one of said first set of output ports of said output slab and one of said individual channels of said first set of WDM LO signals of said first polarization from one of said adjacent second set of output ports of said output slab, or, to receive one of said individual channels of said second set of WDM data-bearing signals of said second polarization from one of said third set of output ports of said output slab and one of said individual channels of said second set of WDM LO signals of said second polarization from one of said adjacent fourth set of output ports of said output slab, and wherein each of said mixers is configured to receive said individual channels via non-crossing waveguides.

5. The apparatus of claim 4, further including a plurality of balanced detectors, wherein each of said balanced detectors is configured to receive outputs from a corresponding one of said optical mixers via non-crossing waveguides.

6. The apparatus of claim 1, wherein said AWG demultiplexer, and input and output waveguides connected to said AWG demultiplexer are formed from a planar silica layer.

7. The apparatus of claim 1, further comprising an optical source configured to provide said WDM LO signal, said WDM LO signal having a channel spacing about equal to a channel spacing of said WDM data-bearing signal.

8. The apparatus of claim 1, further comprising a polarization beam splitter configured to separate a polarization diverse WDM data-bearing signal to provide said first set of said WDM data-bearing signals of said first polarization to said first set of input ports, and to provide said second set of said WDM data-bearing signals of said second polarization to said third set of input ports.

9. The apparatus of claim 1, further comprising a polarization beam splitter configured to separate a polarization diverse WDM LO signal to provide said first set of said WDM LO signals of said first polarization to said second set of input ports, and to provide said second set of said WDM LO signals of said second polarization to said fourth set of input ports.

10. The apparatus of claim 1, wherein said first and second sets of input ports, said third and fourth sets of input ports, and said second and third sets of input ports are separated by a plurality of unused input ports.

11. A method, comprising:
forming an arrayed waveguide grating (AWG) demultiplexer including forming an input slab having:
a first set of input ports each configured to receive individual channels of a first set of wavelength division multiplexing (WDM) data-bearing signals of a first polarization;
a second set of input ports each configured to receive individual channels of a first set of WDM local oscillator (LO) signals of said first polarization, wherein said first set of input ports and said second set of input ports are adjacent to and interleaved with each other;
a third set of input ports configured to receive individual channels of a second set of WDM data-bearing signals of a second polarization; and
a fourth set of input ports configured to receive individual channels of a second set of WDM LO signals of said second polarization, wherein said third set of input ports and said fourth set of input ports are adjacent to and interleaved with each other, and, said first set of input ports and said second set of input ports are disjoint from said third set of input ports and said fourth set of input ports.

12. The method of claim 11, wherein forming said AWG demultiplexer further includes forming an input slab, wherein said AWG is configured to route:
said individual channels of said first set of WDM data-bearing signals of said first polarization to a first set of output ports of said output slab;
said individual channels of said first set of WDM LO signals of said first polarization to a second set of output ports of said output slab, wherein said first set of output ports and said second set of output ports are adjacent to and interleaved with each other;
said individual channels of said second set of WDM data-bearing signals of said second polarization to a third set of output ports of said output slab; and
said individual channels of said second set of WDM LO signals of said second polarization to a fourth set of output ports of said output slab, wherein said third set of output ports and said fourth set of output ports are adjacent to and interleaved with each other, and, said first set of output ports and said second set of output ports are disjoint from said third set of output ports and said fourth set of output ports.

13. The method of claim 11, wherein said AWG demultiplexer is configured to have a channel spacing that is about one half a channel spacing of the data signal comb.

14. The method of claim 11, further including forming a plurality of optical mixers, each mixer being configured: to receive one of said individual channels of said first set of WDM data-bearing signals of said first polarization from one of said first set of output ports of said output slab and one of said individual channels of said first set of WDM LO signals of said first polarization from one of said adjacent second set of output ports of said output slab, or, to receive one of said individual channels of said second set of WDM data-bearing signals of said second polarization from one of said third set of output ports of said output slab and one of said individual channels of said second set of WDM LO signals of said second polarization from one of said adjacent fourth set of output ports of said output slab, and wherein each of said mixers is configured to receive said individual channels via non-crossing waveguides.

15. The method of claim 14, further including forming a plurality of balanced detectors, wherein each of said balanced detectors is configured to receive outputs from a corresponding one of said optical mixers via non-crossing waveguides.

16. The method of claim 11, wherein said AWG demultiplexer, and input and output waveguides connected to said AWG demultiplexer are formed from a planar silica layer.

17. The method of claim 11, further comprising coupling an optical source configured to provide said WDM LO signals to said second and fourth sets of input ports, said WDM LO signals having a channel spacing about equal to a channel spacing of said WDM data-bearing signals.

18. The method of claim 11, further comprising forming a polarization beam splitter configured to separate a polarization diverse WDM data-bearing signal to provide said first set of said WDM data-bearing signals of said first polarization to said first set of input ports, and to provide said second set of said WDM data-bearing signals of said second polarization to said third set of input ports.

19. The method of claim 11, further comprising forming a polarization beam splitter configured to separate a polarization diverse WDM LO signal to provide said first set of said WDM LO signals of said first polarization to said second set of input ports, and to provide said second set of said WDM LO signals of said second polarization to said fourth set of input ports.

20. The method of claim 11, wherein said first and second sets of input ports, said third and fourth sets of input ports, and said second and third sets of input ports are separated by a plurality of unused input ports.

* * * * *